United States Patent [19]

Firey

[11] Patent Number: 4,848,302
[45] Date of Patent: Jul. 18, 1989

[54] FUEL VAPORIZER FOR CREATING CONTINUOUSLY VARIABLE STRATIFIED FUEL AIR MIXTURES AT ENGINE INTAKE

[76] Inventor: Joseph C. Firey, P.O. Box 15514, Seattle, Wash. 98115-0514

[21] Appl. No.: 187,322

[22] Filed: Apr. 28, 1988

[51] Int. Cl.⁴ .................. F02M 31/00; F02M 31/12; F02M 29/02
[52] U.S. Cl. ................... 123/579; 123/523; 261/89; 261/142
[58] Field of Search ............ 123/430, 523, 549, 557; 261/89, 90, 142

[56] References Cited

U.S. PATENT DOCUMENTS

| | | | |
|---|---|---|---|
| 2,397,327 | 3/1946 | Pratt | 261/90 |
| 4,147,137 | 4/1979 | Firey | 123/430 |
| 4,153,653 | 5/1979 | Moore | 261/89 |
| 4,205,647 | 6/1980 | Firey | 123/523 |
| 4,264,539 | 4/1981 | Berg | 261/90 |
| 4,425,892 | 1/1984 | Firey | 123/430 |
| 4,473,057 | 9/1984 | Collins | 261/90 |
| 4,550,706 | 11/1985 | Hoffman | 123/523 |

*Primary Examiner*—Willis R. Wolfe
*Assistant Examiner*—M. Macy

[57] ABSTRACT

A fuel vaporizer for creating continuously variable stratified fuel vapor air mixtures at intake is described for use with internal combustion engines. Liquid fuel spread of the inner surface of a rotating heated cylinder evaporates into the intake air moving in pulses at approximately right angles to the liquid motion. The resulting fuel vapor air mixture is continuously variable stratified and the consequent delay gradients permit the use of compression ignition for the engine without excessive noise.

10 Claims, 8 Drawing Sheets

SECTION A-A OF FIGURE 1

FUEL VAPORIZER FOR CREATING CONTINUOUSLY VARIABLE STRATIFIED FUEL AIR MIXTURES AT ENGINE INTAKE

CROSS REFERENCES TO RELATED APPLICATIONS

The invention described herein is related to my following issued U.S. Patents:
U.S. Pat. No. 4,147,137; April 3, 1979
U.S. Pat. No. 4,205,647; June 3, 1980
U.S. Pat. No. 4,425,892; Jan. 17, 1984

BACKGROUND OF THE INVENTION

1. Field of the Invention

This invention is in the field of internal combustion engines and, more specifically, such engines utilizing stratified fuel vapor air mixtures at the engine intake manifold. Both spark ignition and compression ignition internal combustion engines are included.

The following tentative classifications are taken from my related U.S. Pat. Nos. 4,147,137; 4,205,647; 4,425,892: 123/127, 32 ST, 32 SP, 122 D, 133, 190 A, 190 R, 430, 478, 523; 48/180 S; 261/89, 112.

2. Description of the Prior Art

A description of several prior art stratified air fuel mixtures and their use at engine intake is contained in reference A, U.S. Pat. 4,147,137, and this description material is incorporated herein by reference thereto. A brief summary of portions of this referenced subject matter particularly relevant to this patent application follows. Three types of intake air fuel mixture stratification are described therein: two barrel carburetor type; injected liquid spray type; multiregional type. Additionally, it is shown therein that stratification created at engine intake survives at least until combustion and that extremely lean air fuel ratio mixtures can be compression ignited. Further, it is shown therein that the noise consequent upon the compression igniting of near stoichiometric air fuel mixture regions can be reduced by making such regions individually of small volume, by scattering such regions about in amongst other kinds of regions, and by arranging that large differences exist in the compression ignition time delay characteristics of those regions which are compression ignited. The engine intake stratifier described and claimed in reference A creates a multiregional stratified air fuel mixture at engine intake by use of a stratifier valve with several separate air fuel mixture creating channels in combination with other elements. An engine intake mixture possessing multiregional stratification consists of many individual regions, each such region being small and essentially of uniform mixture within itself, and adjacent regions differ as to the air fuel ratio or the fuel type or both. The volume of individual regions in the multiregional air fuel mixture can be reduced by increasing the port indexing rate of the stratifier valve and the extent of scattering of one particular type of air fuel mixture region can be increased by increasing the number of active ports and separate air fuel mixture creating channels used by the stratifier valve. Differences in compression ignition time delay characteristics can be made larger by using different kinds of fuels and/or different air fuel mixture ratios as between the several separate air fuel mixture creating channels. In these ways the compression ignition noise level can be reduced when multiregional engine intake stratification is used as described in reference A.

It is a disadvantage of the engine intake stratifier of reference A that to accomplish large reductions of engine noise due to compression ignition requires the stratifier valve to become more complex mechanically, the number of separate air fuel mixing channels to become large, and the number of different fuels and hence fuel tanks to become large, and thus the complexity and cost of the engine system are increased as noise level is reduced.

Many of the beneficial objects made available by use of multiregional intake stratification result from the fact that compression ignition can then be used without excess engine noise. Because compression ignition is intended to occur, higher engine compression ratios are used with consequently increased engine efficiency. Additionally, engine supercharge can be used without excess engine noise. Because very lean and fully evaporated mixtures can be used, the exhaust emissions of undesirable smogforming materials and of smoke can be reduced as compared to conventional internal combustion engines. These and other beneficial objects made available by use of multiregional stratified engine intake mixtures are described in reference A.

Additional description of prior art stratified air fuel mixtures at engine intake and methods for creating such mixtures are contained in U.S. Pat. 4,205,647 and this description of prior art is incorporated herein by reference thereto.

The devices of this invention are used in combination with an internal combustion engine. The term "internal combustion engine" is used herein and in the claims to mean the known combination of elements comprising cylinders, cylinder heads, pistons operative within said cylinders and connected to a crankshaft via connecting rods, valves and valve actuating means or cylinder ports, lubricating system, cooling system, ignition system if needed, flywheels, starting system, fuel supply system, fuel-air mixing system, intake manifolds with inlets, and exhaust pipes, torque control system, etc. as necessary for the proper operation of said internal combustion engine. The term "internal combustion engine" is used hereinafter and in the claims to include also the known combination as described above but wherein the cylinders, cylinder heads, pistons operative within said cylinders and connected to a crankshaft via connecting rods, valves and valve actuating means or cylinder ports, are replaced by a rotary engine mechanism combination, comprising a housing with a cavity therein, and plates to enclose the cavity, a rotor operative with said cavity and sealing off separate compartments within said cavity and connecting directly or by gears to an output shaft, ports in said housing for intake and exhaust. The term "internal combustion engine" as used herein includes atmospherically aspirated internal combustion engines as well as supercharged engines using turbocharges or other types of intake air compressors. The term "internal combustion engine" is used herein and in the claims to mean internal combustion engines of the spark ignition type, of the compression ignition type and of the type using both spark and compression ignition.

The term, internal combustion engine mechanism, is used hereinafter and in the claims to mean all those portions of an internal combustion engine, as defined hereinabove, except the fuel air mixing system and the torque control system. An internal combustion engine mechanism contains an integral number of engine cylinders. These several cylinders can be connected in groups via an intake manifold common only to all cylinders of a group. Herein and in the claims each such group of engine cylinders connecting exclusively to a common intake manifold are considered to be a single internal combustion engine mechanism. Thusly defined two or more internal combustion engine mechanisms may be combined together in a single block and with a common crankshaft.

Continuously variable stratified fuel vapor air mixtures at engine intake are described in reference H, my U.S. Pat. No. 4,425,892 and differ from multiregional intake stratification and other prior art types of intake stratification. Continuously variable stratified air fuel vapor mixtures are created when, within a device for creating air fuel vapor mixtures for internal combustion engines from engine intake air flow and a moving evaporating liquid fuel, the intake air flows relative to the motion paths of the liquid fuel so that the air fuel vapor mixtures, created by the fractional evaporation of the moving multicomponent liquid fuel into adjacent intake air, change along the motion paths of the moving liquid fuel at least as to the fuel vapor fractions present and change across these liquid fuel motion paths at least as to the ratio of air to fuel vapor. Gradients of the compression ignition time delay can exist within a continuously variable stratified air fuel mixture. The compression ignition process can take place gradually where delay gradients exist and in consequence the engine noise of compression ignition is greatly reduced. Continuously variable stratification differs from multiregional stratification and from injected liquid spray stratification in that air fuel vapor ratio and/or the kinds of fuel molecules present vary in three dimensions at points throughout a continuously variable stratified mixture. A multiregional stratified mixture contains many differing regions but any one region is a volume of air fuel mixture within which both air fuel ratio and the kinds of fuel molecules present remain essentially the same in all three dimensions. In a similar way continuously variable stratification differs from injected liquid spray stratification as described, for example, in reference B. With these kinds of injected liquid spray stratification, the air fuel mixture formed by evaporation around each liquid droplet is approximately angularly symmetric about the droplet, except for flow distortions of the air-vapor envelope. Hence, within continuous surfaces, everywhere normal to radial lines from the droplet, with due allowances for envelope distortions, both the air fuel ratio and the kinds of fuel molecules present remain essentially the same in the two dimensions of the surface.

Reduced engine noise due to compression ignition can be achieved by use of continuously variable fuel air mixtures at engine intake. As discussed in reference A, compression ignition of air fuel mixtures occurs abruptly following a time delay interval and pressure waves are generated whose strength is proportional to the volume of air fuel mixture thus abruptly ignited. The engine noise of compression ignition results from these pressure waves and hence the engine noise is also proportional to the volume of air fuel mixture abruptly compression ignited. With multiregional stratification the noise of compression ignition can be reduced by reducing the volume of the individual regions and by creating differences in the compression ignition time delay between regions as described in reference A.

With continuously variable stratification the compression ignition time delay can also be made to vary continuously. The compression ignition time delay varies with the kinds of fuel molecules present as well as with the air fuel ratio. Air fuel mixtures that are stoichiometric or leaner in fuel content most commonly show increased compression ignition time delay with increasing air fuel ratio. The effects of the kinds of fuel molecules upon the compression ignition time delay are complex and can be very large. For example, pure benzene $C_6H_6$ appears to have an almost infinite compression ignition time delay whereas normal hexane, $C_6H_{14}$, has a very short compression ignition time delay. Additive fuel molecules, such as aromatic amines and organic peroxides, also greatly affect the compression ignition time delay as is well known in the art. The term delay gradient is here defined as the distance rate of change of compression ignition time delay along a line within an air fuel mixture. The delay gradients at any particular point in an air fuel mixture are a composite of the effects on compression ignition time delay of both the local variation of air fuel ratio and the local variation of kinds of fuel molecules present.

Within a continuously variable stratified air fuel mixture delay gradients can be created in three dimensions within the fuel containing portions of the mixture since the air fuel ratio and/or the kinds of fuel molecules present vary in three dimensions.

That compression ignition can take place in a gradual manner in the presence of a delay gradient can be seen by examining the known details and current theories of the compression ignition process of hydrocarbon fuels. Compression ignition takes place via a chain branching reaction between fuel and oxygen wherein reaction is carried onward by chain carriers, usually free radicals. Chain branching via creation of extra chain carriers, and hence reaction speed up, awaits the accumulation of some unknown chain branching intermediate, perhaps peroxide molecule, which is itself a product of the chain reaction. The compression ignition delay is thus the time needed to accumulate enough of this branching intermediate so that chain branching and reaction speed up can occur. Hence the concentration of chain carriers in a fuel air mixture remains low until the compression ignition time delay has almost expired since only then are large numbers of chain carriers being created via the branching intermediate. Once adequate branching commences chain carriers concentrations rise rapidly and the overall reaction accelerates rapidly and this speed up is compression ignition. Details of this hydrocarbon and oxygen chain branching reaction are presented in reference C and there is general agreement about these chemical characteristics of compression ignition even though many reaction details remain obscure.

Controversy, however, surrounds the description of the compression ignition process details following expiration of the delay period. According to the autoignition theory, as described for example in reference D, noisy compression ignition, such as knock, occurs only when the branching intermediate accumulates uniformly and thus the compression ignition delay expires essentially simultaneously throughout an appreciable volume of air fuel mixture. With a delay gradient the branching intermediate accumulates non-uniformly and ignition delay expires at different times in different places and the consequent autoignition must proceed gradually from one region to the next only as the ignition delay expires in each succeeding region, according to this autoignition theory.

According to the flame acceleration theory, as described for example in reference E, noisy compression ignition, such as knock, occurs when a slow moving normal flame meets a volume of air fuel mixture containing sufficient of the branching intermediate that compression ignition delay is about to expire throughout this volume. Since the normal flame is moved forward, at least in part, via the forward diffusion of chain carriers, a large speed up of the flame might well occur in a volume which was already generating chain carriers in large numbers via the branching intermediate, and this flame speed up is considered to be knock, or compression ignition, according to this theory. When, however, a slow moving normal flame enters a delay gradient, such flame speed up cannot occur since the needed amount of the branching intermediate can exist only in at most a very small volume. Hence, such a normal flame would advance only slowly through an air fuel mixture possessing a delay gradient, according to this flame acceleration theory.

According to the detonation wave theory, as described for example in reference F, the reaction acceleration consequent upon expiration of the ignition delay within one region generates shock waves emanating from this first reaction region and these shock waves can become detonation waves provided the shock compressed air fuel mixture immediately behind the wave front can also accelerate its own reaction sufficiently to reinforce the shock wave. If a detonation wave is thusly created, the compression ignition will be noisy according to this theory. The shock wave compressed air fuel mixture can only thusly accelerate its own reaction and create a detonation if the amount of the needed branching intermediate is already nearly adequate for expiration of the compression ignition delay. Though shock compression can speed up a reaction, it cannot appreciably increase the amount of the needed branching intermediate within the very short time of wave passage. Within the air fuel mixture possessing a delay gradient the initial shock wave creating reaction occurs in the region whose ignition delay interval first expires. In all adjacent regions the amount of branching intermediate is necessarily inadequate for expiration of the delay interval and hence is also inadequate for the reaction acceleration within the shock wave compressed material needed to create a detonation wave. A detonation wave and the consequent engine noise are thus not created when delay gradients exist, according to this detonation wave theory.

We thus see that the gradual and reasonably quiet occurrence of compression ignition will take place in air fuel mixtures possessing a delay gradient, according to each of the existing theories of compression ignition.

REFERENCES

A. U.S. Pat. No. 4,147,137, April 3, 1979.

B. "Fumigation Kills Smoke--Improves Diesel Performance," Alperstein, Swim, and Schweitzer, SAE Trans. Vol. 66, 1958, pg. 574.

C. "Combustion, Flames and Explosions of Gases," Lewis and Von Elbe, Academic Press, 1961, Chapter 4.

D. "A Fundamentally Based Model of Knock In The Gasoline Engine, " Kirsche and Quinn, Sixteenth Symposium (International) On Combustion, The Combustion Institute, pg. 233, 1977.

E. "Effect of Antiknocks On Flame Propagation In A Spark Ignition Engine," S. Curry, Ninth Symposium (International) On Combustion, Academic Press, pg. 1056, 1963.

F. "Shock Waves From Preflame Reactions in a Motored Engine, Firey and Lavy, Combustion and Flame," Vol. 5, No. 1, March 1961, pg. 27.

G. U.S. Pat. No. 4,205,647, Jan. 3, 1980.

H. U.S. Pat. No. 4,425,892, Jan. 17, 1984.

SUMMARY OF THE INVENTION

The fuel vaporizers of this invention create continuously variable stratified fuel vapor air mixtures for admission to the intake manifold of an internal combustion engine. Liquid fuel is spread upon the inner surface of a rotating outer cylinder and engine intake air flows in pulses through the inside of this outer cylinder. The inner surface of the outer cylinder is heated to cause evaporation of the liquid fuel spread thereon. Fractional fuel evaporation and the rotation create a variation of the kinds of fuel molecules in the fuel vapor air mixture in an angular direction about the centerline of the outer cylinder. The air flow pulses create a variation of fuel vapor air ratio in the direction of the outer cylinder centerline. A second inner cylinder is placed inside the outer cylinder with the two cylinder centerlines offset from one another. The consequent angular variation of air flow creates a variation of fuel vapor air ratio in an angular direction about the outer cylinder centerline. The air flowing immediately adjacent to the inner surface of the outer cylinder receives all of the evaporated fuel and then by diffusion transfers some portions of this evaporated fuel to air portions further removed from the inner surface. In this way a variation of fuel vapor air ratio is created at right angles to the outer cylinder centerline. Thus a continuously variable stratified fuel vapor air mixture is created at exit of this fuel vaporizer wherein at any point within the mixture, gradients of fuel vapor air ratio and/or kinds of fuel molecules present exist in three dimensions. This stratified fuel vapor air mixture passes through the engine intake manifold and into the engine cylinder during intake and these gradients of fuel vapor air ratio and fuel molecule kind survive during compression to create gradients of compression ignition delay within the fuel vapor mixture during combustion. In consequence, compression ignition can occur at different times in different portions of the fuel air mixture and this gradual compression ignition process is much quieter than compression ignition of usual fuel air mixtures which occurs abruptly with very high noise intensity. This is a principle beneficial object of my invention, that it makes possible the use of compression ignition without excess noise generation.

BRIEF DESCRIPTION OF THE DRAWINGS

An example of a fuel vaporizer of this invention is shown in cross section in FIG. 1 and the cross section A—A of FIG. 1 is shown in FIG. 2. A fuel vaporizer of this invention is shown in FIG. 3 connected to the intake manifold of an internal combustion engine mechanism. A liquid fuel cascade form of fuel vaporizer is shown partially in cross section in FIG. 4 with parallel air flow in three separate passages. Another liquid fuel cascade form of fuel vaporizer is shown in partial cross section in FIG. 5 with air flow also in cascade in three series passages. An example means for adjusting the offset between the outer cylinder centerline and the inner solid member centerline is shown in FIG. 6. A liquid fuel spreader means is shown in FIG. 7 fitted with an example means for adjusting the area over which the liquid fuel is spread. A scheme for heating the outer cylinder of a fuel vaporizer is shown schematically in FIG. 8.

DESCRIPTION OF THE PREFERRED EMBODIMENTS

Figure 1:
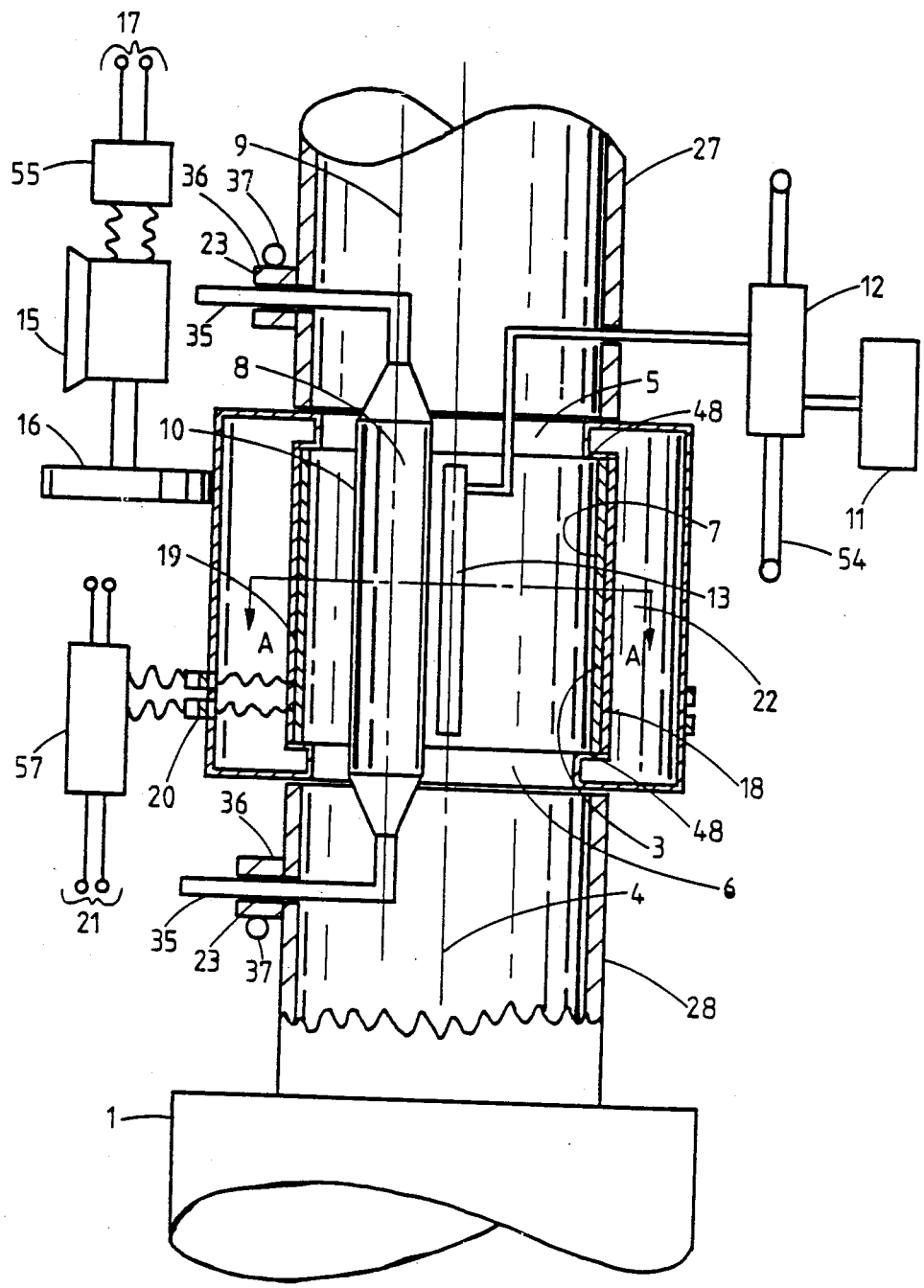

The fuel vaporizer devices of this invention are used with an internal combustion engine mechanism to create continuously variable stratified fuel vapor air mixtures at engine intake. As described hereinabove, use of such continuously variable stratified fuel vapor air mixtures at engine intake permits engine operation using compression ignition without excessive noise and this is a principle beneficial object of this invention. The continuously variable stratified fuel vapor air mixtures created by the fuel vaporizer devices of this invention are essentially similar to those created by my earlier invention described in U.S. Pat. No. 4,425,892, but the apparatus used herein differs from that described in U.S. Pat. No. 4425892. Among other differences, the fuel vaporizer apparatus described herein is mechanically simpler than the apparatus described in my U.S. Pat. No. 4425892, and this is another beneficial object of this invention.

A fuel vaporizer device of this invention comprises the following elements:

1. An outer, hollow cylinder comprising; an outer surface, an inner surface, a centerline of symmetry, an inlet end and an outlet end to the inner surface thereof.

2. An inner, solid member comprising; a principle centerline with an outer continuous surface disposed about this principle centerline, and this outer surface being small enough to fit inside the inner surface of the outer hollow cylinder when the inner cylinder principle centerline is approximately parallel to the outer cylinder centerline of symmetry. This inner solid member may also be cylindrical and possess a principle centerline of symmetry but this is not required.

3. A liquid fuel supply source from which fuel passes, via a means for metering and transferring the fuel, to a means for spreading the liquid fuel upon the inner surface of the outer cylinder.

4. Means for rotating the outer hollow cylinder about its centerline of symmetry at a speed sufficient to retain the liquid fuel, thusly spread, on the inner surface of the outer cylinder.

5. Means for heating the outer hollow cylinder. This heating process then also heats the liquid fuel spread on the inner surface causing portions of the liquid to evaporate. In some applications it will be preferred that the rate of such heating be controlled, by a control means, to be sufficient to cause essentially complete evaporation of the spread liquid fuel within at most one turn of the fuel about the centerline of the outer cylinder.

6. A positioning means is used to hold the inner solid member inside the outer hollow cylinder so that the distance between the outer surface of the inner solid member and the inner surface of the outer hollow cylinder varies angularly about the centerline of symmetry of the outer cylinder.

7. An air inlet is connected, via a connecting means, to the inlet end of the outer hollow cylinder so that air from the air inlet flows through the inside of the outer hollow cylinder from the inlet end toward the outlet end thereof.

8. A fuel air mixture pipe comprises: an inlet end connected via a connecting means to the outlet end of the outer cylinder; an outlet end connected via a connecting means to the inlet of the intake manifold of an internal combustion engine mechanism. With these connections whatever fuel air mixture is created inside the outer cylinder is passed into the intake manifold of the internal combustion engine mechanism.

9. Preferably the internal combustion engine mechanism thusly connected to a single fuel vaporizer comprises a number of cylinders equal to the number of piston strokes required for a single piston to complete one engine cycle. Thus for this preferred case a single fuel vaporizer of this invention would connect to two cylinders of a two stroke cycle internal combustion engine mechanism or to four cylinders of a four stroke cycle internal combustion engine mechanism. For engines of more than these numbers of cylinders more than one fuel vaporizer is preferably used. With this preferred case air flow is essentially continuous through the inside of the outer hollow cylinder but is unsteady and occurs in separate pulses. A single fuel vaporizer can alternatively be connected to any number of engine cylinders.

When the engine is operating a pulse of air flows in sequence through the air inlet, the inner surface of the outer hollow cylinder, the fuel air mixture pipe, the engine intake manifold and into one of the engine cylinders during each intake process of the connected internal combustion engine mechanism. The air mass flow rate during each such pulse starts slowly, increases to a maximum and then decreases to a low flow. As this air mass flows through the inner surface of the outer cylinder portions of the liquid fuel spread thereon evaporate into this air mass and thus create an air fuel vapor mixture. The rate of this fuel evaporation, being determined principally by the heating of the outer cylinder, is essentially steady and as a result the fuel vapor air ratio of the created air fuel vapor mixture varies along the principle direction of air flow. A fuel richer mixture is created in those portions of each air mass pulse which flow at low flow rate and a fuel leaner mixture is created in those portions of each air mass pulse which flow at high flow rate. In this way the air fuel vapor ratio within each such intake mass of air changes along the principle direction of air flow which is approximately parallel to the centerline of symmetry of the outer cylinder.

As described above the gap between the outer surface of the inner solid member and the inner surface of the outer hollow cylinder varies angularly about the centerline of symmetry of the outer hollow cylinder. As a result the air mass passing through each angular segment about this centerline of symmetry varies and hence also the air fuel vapor ratios created in each such angular segment also vary. Where this gap is small the air mass is small and a fuel richer mixture results since fuel evaporation is essentially steady. Where this gap is large the air mass is large and a fuel leaner mixture results. In this way the air fuel vapor ratio within each intake mass of air changes angularly about the centerline of symmetry of the outer hollow cylinder and thus angularly across the principle direction of air flow.

The evaporating fuel enters first those air mass portions next to the inner surface of the outer hollow cylinder upon which the liquid fuel was spread. Fuel vapor reaches deeper air mass portions, further inward in a radial direction from this inner surface, by diffusion. As a result the air fuel vapor ratio within each intake mass of air changes radially across the centerline of symmetry of the outer hollow cylinder and thus radially across the principle direction of air flow. The air fuel vapor ratio is fuel richer at outer radii next to the inner surface of the outer cylinder. The air fuel vapor ratio is fuel leaner at inner radii next to the outer surface of the inner solid member.

In this manner a fuel vaporizer of this invention creates a continuously variable stratified fuel vapor air mixture at engine intake wherein the fuel vapor to air ratio varies in the three dimensions, along the principle direction of air flow, angularly across the principle direction of air flow, and radially across the principle direction of air flow. As a result the compression ignition time delay of the fuel vapor air mixture can also be made to vary continuously in these three dimensions and reduced engine noise due to use of compression ignition can be achieved as described hereinabove and this is a principle beneficial object of this invention.

In addition to these above described variations of fuel vapor air ratio, variations of the types of fuel vapor molecules present can also be created both angularly and radially across the principle direction of air flow. When a liquid fuel containing many different kinds of molecules is spread upon the inner surface of the outer cylinder those fuel molecules first evaporate which have the higher vapor pressure and those fuel molecules last evaporate which have the lower vapor pressure. Since the spread liquid fuel is moving with the inner surface of the outer cylinder, those fuel vapor air mixtures created next to the angular position of the fuel spreader contain a higher proportion of fuel molecules of high vapor pressure. Correspondingly those fuel vapor air mixtures created at angular positions angularly distant in the direction of rotation of the outer cylinder contain a higher proportion of fuel molecules of low vapor pressure. As fuel vapor molecules diffuse radially inward within each air mass portion the lower mass molecules will diffuse more rapidly than the higher mass molecules. Thus in a radial direction those fuel vapor air mixtures next to the inner surface of the outer cylinder contain a higher proportion of higher mass molecules and those fuel vapor air mixtures next to the outer surface of the inner solid member contain a higher proportion of lower mass molecules. These angular and radial variations of the types of fuel molecules present within the created fuel vapor air mixture can be used to augment the compression ignition time delay variations by suitable selection of the various types of fuel molecules placed into the liquid fuel.

The continuously variable stratified fuel vapor air mixtures thusly created by the devices of this invention are essentially similar to those created by my earlier invention described in U.S. Pat. No. 4425892. My present invention differs from that of U.S. Pat. No. 4425892 in various ways of which the following may be considered:

1. The area needed for heat transfer to cause evaporation of the liquid fuel is herein created by spreading a liquid film upon a heated solid surface. In U.S. Pat. No. 4425892 this needed area is created by atomizing the liquid into many small droplets via an atomizer device.

2. The heat supply needed to cause evaporation of the liquid fuel is herein from an external source, such as the engine exhaust gas. In U.S. Pat. No. 4425892 this heat must come from the intake air mass into which the liquid droplets are dispersed and this either limits the range of mixtures creatable or requires a preceding air heater.

The liquid fuel spreader used herein can be mechanically simpler and hence of lower cost than the liquid atomizer used in U.S. Pat. No. 4425892 and this is another beneficial object of this invention.

Figure 2:
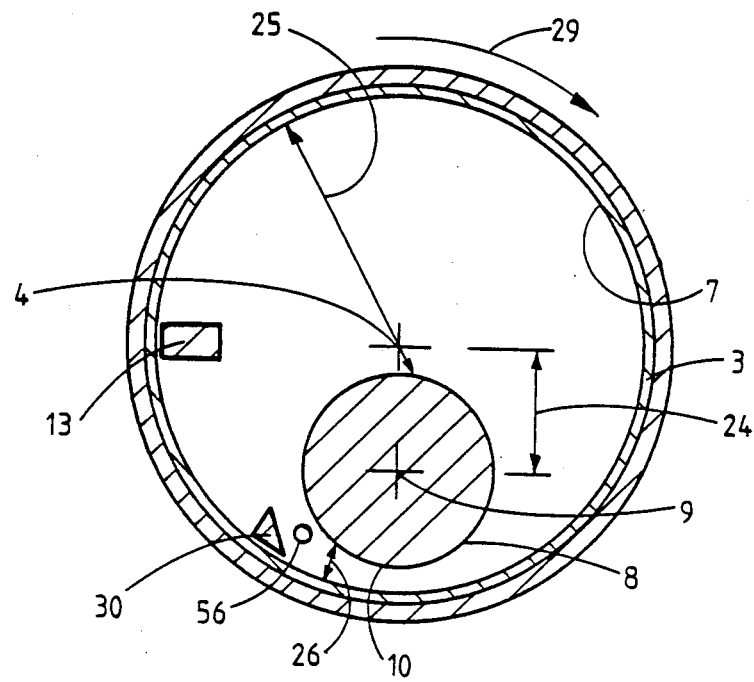
Figure 3:
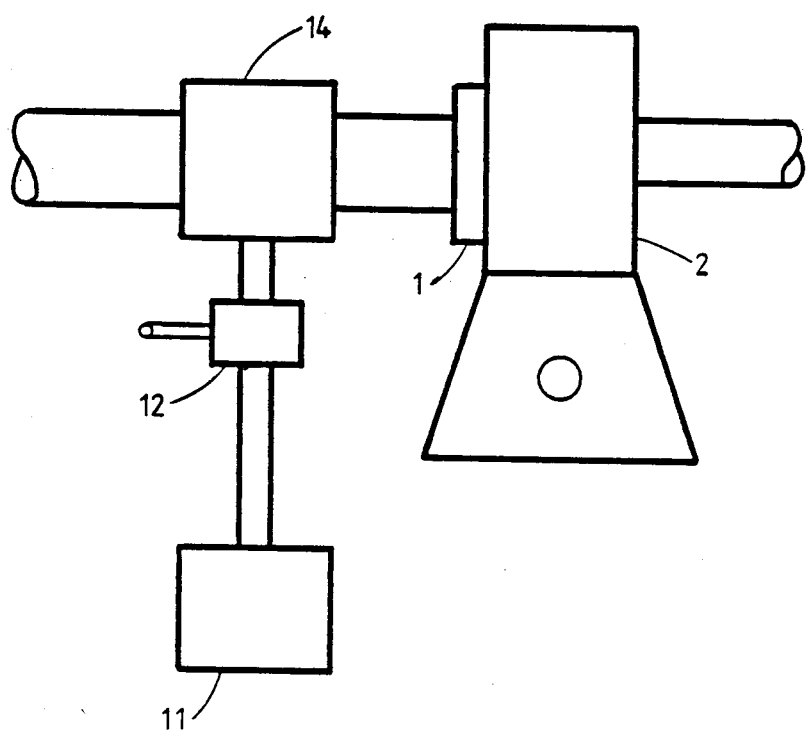

An example of a fuel vaporizer of this invention, 14, is shown partially in FIG. 1, with a cross sectional view thereof in FIG. 2, and as connected to the intake manifold, 1, of an internal combustion engine mechanism, 2, in FIG. 3, and comprises the following elements:

A. An outer hollow cylinder, 3, with a centerline of symmetry, 4, and comprising an inlet end, 5, and an outlet end, 6, to the inner surface, 7, thereof.

B. An inner solid member, 8, with a principle centerline, 9, and an outer surface, 10, disposed about this principle centerline, 9, so that this outer surface, 10, can fit inside the inner surface, 7, of the outer hollow cylinder, 3, when the inner cylinder principle centerline, 9, is approximately parallel to the centerline of symmetry, 4, of the outer hollow cylinder, 3, as shown in FIG. 1 and FIG. 2. The term solid member is used herein to mean either a solid piece as shown for element, 8, in FIG. 2, or alternatively a hollow piece whose outer surface, 10, is continuous without holes into the hollow interior, these forms being functionally equivalent for the purposes of this invention.

C. A liquid fuel supply source, 11, from which fuel is pumped and metered, by a means for metering and transferring liquid fuel, 12, to a means for spreading liquid fuel, 13, upon the inner surface, 7, of the outer hollow cylinder, 3.

D. A means for rotating, 15, the outer cylinder, 3, about its centerline of symmetry, 4. This could be an electric motor with friction drive wheel, 16, and energized from a source of electric power, 17, as shown in FIG. 1, but other rotator means can also be used such as mechanical drive from the engine shaft. The outer cylinder, 3, is to be rotated at least at a sufficient speed that centrifugal force will hold the spread liquid upon the inner surface, 7.

E. A means for heating, 18, the surface, 19, of the outer hollow cylinder, 3. An electrical heating means is shown in FIG. 1 with brushes, 20, transferring electric power from an external source, 21, to the rotating outer cylinder heating means, 18. Other heating means could alternatively be used, such as supplying hot engine exhaust gas into a cavity, 22, around the surface, 19, of the outer hollow cylinder, 3.

F. A positioning means, 23, holds the inner solid member, 8, inside the outer hollow cylinder, 3, with the centerline, 9, of the inner member, 8, offset by a distance, 24, from the centerline, 4, of the outer hollow cylinder, 3. Bars with set screws are shown in FIG. 1 which permits hand adjustment of the offset distance, 24. As shown in FIG. 2, the distance between the outer surface, 10, of the inner member, 8, and the inner surface, 7, of the outer cylinder, 3, varies angularly about the centerline, 4, of the outer cylinder, 3. In consequence the mass rate of flow of the engine intake air also varies angularly about the centerline, 4, of the outer cylinder, 3, more air mass flowing where the distance is large, as at 25, than where the distance is small, as at 26.

G. An air inlet, 27, connects to the inlet end, 5, of the inner surface, 7, of the outer hollow cylinder, 3, so that engine inlet air passing through the air inlet, 27, is directed into the inlet end, 5, of the outer cylinder, 3.

H. A fuel air mixture pipe, 28, connects between the outlet end, 6, of the inner surface, 7, of the outer hollow cylinder, 3, and the engine intake manifold, 1, so that the fuel vapor air mixture created within the inner surface, 7, of the outer hollow cylinder, 3, passes into the engine intake manifold, 1, and thence into the engine cylinders during each intake process of the internal combustion engine mechanism, 2.

I. For purposes of the illustrative example shown in FIG. 1, FIG. 2, and FIG. 3, the internal combustion engine mechanism, 2, can be a four cylinder, four stroke cycle, mechanism. This is a preferred case wherein a single fuel vaporizer of this invention is connected to a number of engine cylinders equal to the number of piston strokes required for a single piston to complete one engine cycle. Hence engine intake processes occur immediately in succession to one another and the engine intake air flows essentially continuously but in separate pulses, one pulse for each engine intake process.

The operation of the example fuel vaporizer of this invention shown in FIGS. 1, 2, and 3 can be described as follows:

1. During each separate intake process of the internal combustion engine mechanism, 2, a pulse of air flows through the air inlet, 27, the inner surface, 7, of the outer hollow cylinder, 3, the fuel air mixture pipe, 28, the intake manifold, 1, and into that cylinder of the internal combustion engine mechanism, 2, currently undergoing an intake process, and in that order. The air flows in an approximately sinusoidal pulse with the result that the air flow speed changes constantly during each pulse due to the motion of the engine piston during intake. The air flow is unevenly distributed in an angular direction about the centerline, 4, of the outer hollow cylinder, 3, since the air flow passage width, 25, 26, varies angularly due to the offset, 24, of the inner member, 8, centerline, 9, from the outer cylinder, 3, centerline, 4.

2. Liquid fuel is pumped and metered from the fuel supply source, 11, by the means for metering and transferring, 12, to the liquid fuel spreader, 13, which spreads the liquid in a film upon the inner moving surface, 7, of the outer hollow cylinder, 3. As the liquid fuel is moved across the principle direction of air flow by the rotation of the outer cylinder, 3, fuel portions evaporate since the outer cylinder, 3, is heated by the heating means, 18. The fuel thus evaporated enters the adjacent moving air mass and a fuel vapor air mixture is created. Where the heating means, 18, heats the outer cylinder, 3, essentially uniformly, the rate of fuel evaporation per unit area of liquid surface will be approximately uniform. In this case the ratio of fuel vapor to air in the fuel vapor air mixtures created will vary angularly about the centerline, 4, due to the angular variation of air flow quantity, and will vary along the centerline, 4, due to the variation of air flow speed during each intake pulse.

3. The evaporating fuel enters first those air portions adjacent to the liquid film spread on the inner surface, 7, of the outer hollow cylinder, 3. Fuel vapor molecules reach deeper air portions, such as those adjacent to the outer surface, 10, of the inner solid member, 8, by slow diffusion. Hence the fuel vapor to air ratio is fuel richer next to the inner surface, 7, of the outer cylinder, 3, and becomes progressively fuel leaner radially inward toward the outer surface, 10, of the inner member, 8.

In these ways the fuel vapor air mixture created within the inner surface, 7, of the outer cylinder, 3, is continuously stratified, with the ratio of fuel vapor to air varying in each of the three directions, along the principle direction of air flow, angularly across the principle direction of air flow, and radially across the principle direction of air flow. Hence also compression ignition delay gradients will exist in these same three directions and these created fuel vapor air mixtures can be compression ignited within the internal combustion engine mechanism, 2, without producing excessive noise or engine damage.

Figure 4:
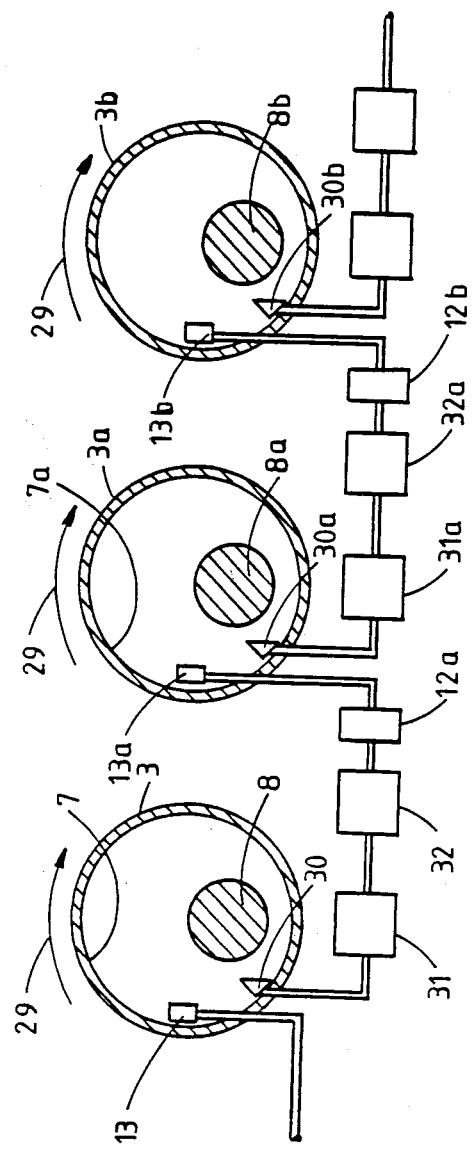

4. In addition to these variations of fuel vapor to air ratio, variations of the kinds of fuel molecules present can also be created, both angularly and radially, by the fuel vaporizers of this invention, whenever a liquid fuel, containing several kinds of fuel molecules, differing as to vapor pressure and molecular mass, is used as is most commonly the case in practice. As the spread liquid film is moved angularly in the direction, 29, from the liquid spreader, 13, by the rotation of the outer cylinder, 3, those molecules of high vapor pressure tend to evaporate first into the air mass flowing next to the liquid spreader, and those molecules of lower vapor pressure tend to evaporate later into air masses flowing angularly away from the liquid spreader, 13, in the rotation direction, 29. In this way an angular variation of the kinds of fuel vapor molecules present is created about the centerline, 4. The evaporated fuel enters first the air mass adjacent the inner surface, 7, of the outer cylinder, 3. Fuel vapor molecules of lower mass diffuse radially inward more rapidly from this inner surface air mass than fuel vapor molecules of higher mass. As a result a variation of the kinds of fuel molecules present is created radially across the centerline, 4.

5. These additional variations of the kinds of fuel molecules present can act to increase or to decrease the compression ignition delay gradients existing within the continuously stratified fuel vapor air mixture by suitable selection of the kinds of fuel molecules placed into the liquid fuel. Where none of the created fuel vapor air mixtures exceed a stoichiometric fuel quantity the radial delay gradient can be increased by use of fuel molecules whose compression ignition delay increases as molecular mass decreases. The effects of fuel molecule type on the net angular delay gradient is more complex. For example, for fuel vapor air mixtures no richer than stoichiometric, compression ignition delay usually increases as fuel vapor to air ratio becomes leaner. Thus, wherever the fuel vapor to air ratio is becoming leaner in the angular direction of rotation the delay gradient created there can be increased by use of fuel molecules whose compression ignition delay increases as molecule vapor pressure decreases. Conversely wherever the fuel vapor to air ratio is becoming richer in the angular direction of rotation the delay gradient created there can be increased by use of fuel molecules whose compression ignition delay increases as molecule vapor pressure increases.

Various of the elements of this invention can be modified and additional elements used for particular applications of this invention.

A liquid scraper means for removing unevaporated liquid fuel from the inner surface of the outer cylinder can be added in order to remove unevaporated liquid. This removed liquid can be sent to a liquid fuel supply source receiver by a pump means for transferring liquid. The liquid scraper is preferably positioned close to the liquid fuel spreader but displaced angularly therefrom in a direction opposite to the direction of rotation of the outer cylinder. With this positioning of the liquid remover means the liquid fuel spread upon the inner surface of the outer cylinder passes at most but one turn around the centerline of symmetry of the outer cylinder. In this way the unevaporated liquid is not remixed into the fresh liquid fuel being first spread upon the inner surface of the outer cylinder. An example of such a liquid scraper means for removing is shown partially in FIG. 2 and also in FIG. 4 and comprises a scraper, 30, a pump transfer means, 31, and a liquid fuel supply source receiver, 32. As shown in FIG. 2 and FIG. 4 the means for removing, 30, is displaced angularly from the liquid fuel spreader, 13, by an appreciable angle opposite to the direction of rotation, 29, of the outer cylinder, 3, so that the spread liquid fuel can travel less than one turn about the centerline, 4, of the outer cylinder, 3, before being removed by the liquid scraper, 30.

Where such an unevaporated liquid remover means is used, it may also be desired to use two or more rotating outer cylinders in a single fuel vaporizer and to pass the liquid fuel in series through each rotating outer cylinder in cascade. Two different forms of such a cascade fuel vaporizer can be used; a parallel cascade vaporizer wherein different air masses flow through each separate rotating outer cylinder; a series cascade vaporizer wherein the same air mass flows through each separate rotating outer cylinder. An example of a parallel cascade vaporizer is shown partially in FIG. 4 and comprises three separate rotating outer hollow cylinders, 3, 3a, 3b, each with a separate inner solid member, 8, 8a, 8b, and a separate liquid fuel spreader means, 13, 13a, 13b, and a separate unevaporated liquid remover means, 30, 30a, 30b. Unevaporated liquid fuel removed by the scraper, 30, from the first outer cylinder, 3, is transferred by the pump means, 31, to another liquid fuel supply source, 32, and from there is transferred by another metering and transferring means, 12a, to the next liquid fuel spreader, 13a, which spreads this previously unevaporated liquid fuel upon the inner surface, 7a, of the second outer hollow cylinder, 3a. In a similar way the scraper, 30a, pump means, 31a, liquid fuel supply source, 32a, and metering and transferring means, 12b, pass liquid fuel, still unevaporated after passing through the second outer cylinder, 3a, into the fuel spreader, 13b, of a third rotating outer cylinder, 3b. The liquid fuel may be thusly passed in cascade through as many rotating outer hollow cylinders as desired or as may be needed to achieve full evaporation of all the liquid fuel. Different and separate air masses flow through each of the separate rotating outer hollow cylinders, 3, 3a, 3b. Where a typical liquid fuel, containing many different types of molecules, is used the fuel vapor air mixtures created inside the three separate rotating outer cylinders, 3, 3a, 3b, will differ between cylinders at least as to the types of fuel vapor molecules present.

Figure 5:
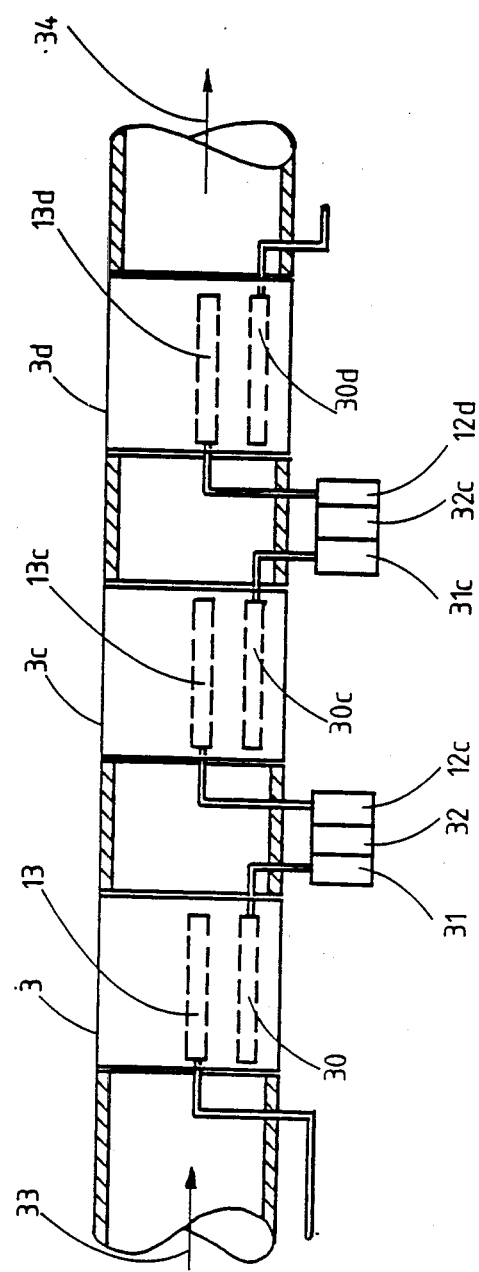

An example of a series cascade fuel vaporizer is shown partially in FIG. 5, and comprises three separate rotating outer hollow cylinders, 3, 3c, 3d, each with a separate liquid fuel spreader means, 13, 13c, 13d, and a separate unevaporated liquid remover means, 30, 30c, 30d, and separate pump transfer means, 31, 31c, liquid fuel supply source, 32, 32c, and metering and transfer means, 12c, 12d. Engine intake air flows in the direction, 33, first into the first rotating outer cylinder, 3, and then successively through the outer cylinders, 3c and 3d, in series in that order. The resulting fuel vapor air mixture passes at, 34, into the engine intake manifold and into that engine cylinder undergoing an intake process. The unevaporated liquid fuel passes in series through the rotating outer cylinders, 3, 3c, 3d, and in that order in the same manner as described hereinabove for the parallel cascade fuel vaporizer of FIG. 4. As shown in FIG. 5, the air mass and the unevaporated liquid flow in cascade series through the three rotating outer cylinders, 3, 3c, 3d, in the same order, but this is not necessary. For example, the air and unevaporated liquid fuel could alternately flow in opposite directions through the series of rotating outer cylinders.

The principle advantage of a cascade fuel vaporizer is to afford a longer time and greater heat transfer area to complete the evaporation of the liquid fuel. In both the parallel cascade fuel vaporizer and the series cascade fuel vaporizer the unevaporated liquid removed from each preceding fuel vaporizer becomes the fuel supply source for the next following fuel vaporizer. In the series cascade fuel vaporizer the fuel vapor air mixture created within each preceding fuel vaporizer becomes the intake air for the next following fuel vaporizer.

The angular variation of fuel vapor to air ratio across the principle direction of air flow can be adjusted by changing the distance of separation between the principle centerline of the inner solid member and the centerline of symmetry of the rotating outer hollow cylinder. Were the inner member cylindrical and the two centerlines coincident, essentially no angular variation of fuel vapor to air ratio would exist since air mass flow would be equal in all angular segments about the common centerlines. As the distance of separation between these two centerlines is increased the angular variation of mixture ratio also increases since the angular variation of air mass flow rate is increased. Various means for adjusting the distance of separation between the principle centerline of the inner solid member and the centerline of symmetry of the outer hollow cylinder can be used wherever it is desired to make adjustable the angular variation of fuel vapor to air ratio about the outer cylinder centerline. A hand adjustment means is shown in FIG. 1, comprising the positioning means, 23, fitted with holder bars, 35, clamps, 36, and set screws 37, secured to the stationary air inlet, 27, and fuel air mixture pipe, 28. An automatic adjustment means may be preferred in certain engine uses.

Figure 6:
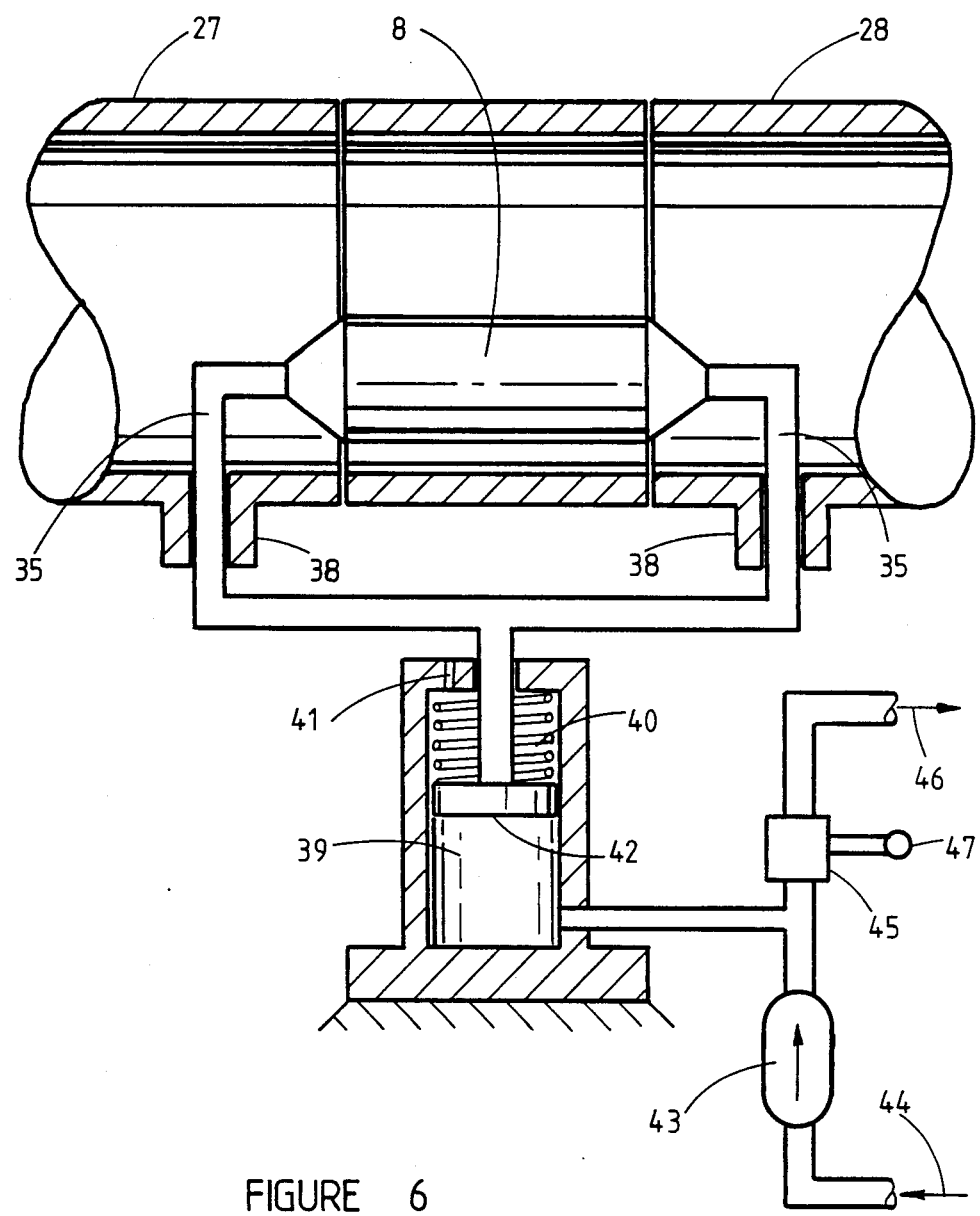

One particular example of an automatic means for adjusting the distance of separation between the principle centerline of the inner solid member and the centerline of symmetry of the outer hollow cylinder is shown partially in FIG. 6 and comprises:

1. Holder bars, 35, are fastened to both ends of the inner solid member, 8, and pass through guides, 38, secured to the stationary air inlet, 27, and fuel air mixture pipe, 28.

2. The holder bars, 35, are joined to a piston and spring actuator, 39, whose spring, 40, side is vented, 41, and whose opposite side, 42 is acted upon by oil pressure from an oil pump, 43.

3. The oil pump, 43, can be driven by various means, such as from the engine crankshaft, to pump oil from an oil supply source, 44, such as the engine crankcase, through a restrictor valve, 45, and to return, 46.

4. The restrictor valve, 45, can be a fixed restriction or a restriction adjustable via a control arm, 47.

The automatic means for adjusting the centerlines separation distance shown in FIG. 6 can adjust the separation in various ways. For example, if the oil pump, 43, is driven at a fixed ratio of speeds from the engine crankshaft and the restrictor valve, 45, is a fixed restriction, then the centerlines separation distance will decrease as engine speed increases since the oil pump, 43, discharge pressure and hence the deflection of the spring, 40, will increase. Alternatively, if the oil pump, 43, is driven at a fixed speed and the restrictor valve, 45, is adjustable via the control arm, 47, then the centerlines separation distance will decrease as the restrictor valve, 45, restriction area is decreased by the control arm, 47, and vice versa. The control arm, 47, can be actuated from various sources such as the engine torque control lever. Also combinations of variable oil pumps speed and variable restrictor controls can be used. Other means for adjusting the centerlines separation distance can also be used.

It would usually be preferred that the liquid fuel spread upon the inner surface of the rotating outer hollow cylinder be retained thereon and prevented from spreading on to the air intake or the fuel air mixture pipe. One particular method of achieving this purpose is to equip the inner surface of the outer hollow cylinder with inward extending lips, 48, as shown in FIG. 1. The centrifugal force on the spread liquid, caused by rotation of the outer cylinder, 3, being sufficient to retain the liquid on the inner surface, 7, is then also adequate to prevent the liquid from crossing over the lips, 48, and the preferred retention is thus achieved.

Figure 7:
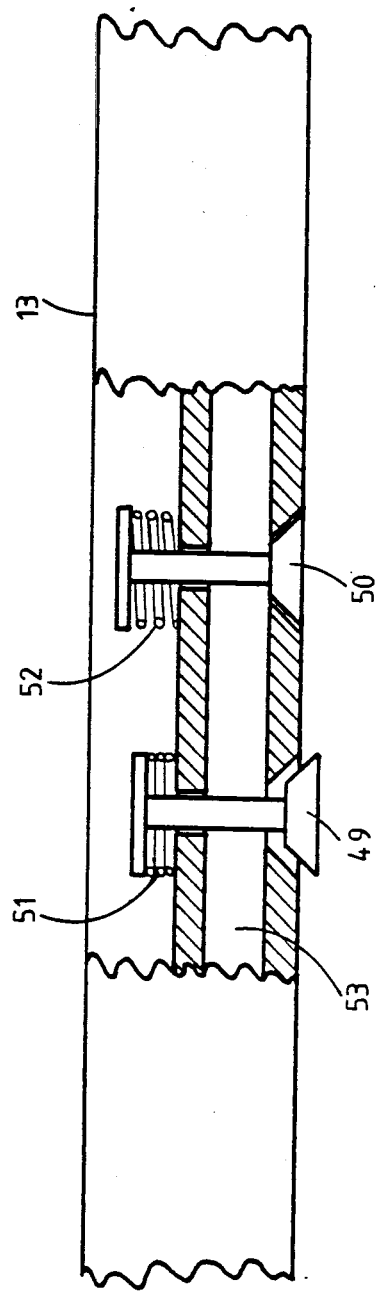

The area of the inner surface of the rotating outer hollow cylinder over which the liquid fuel is spread can be made adjustable and such means for adjusting the area of liquid spread may be preferred in certain engine applications. For example, an engine used over a wide range of both speed and torque, and hence over a wide range of power output, will need to adjust liquid fuel evaporation rate over an essentially equally wide range since fuel vapor flow rate to the engine is approximately proportional to engine power output. One means for adjusting liquid fuel evaporation rate is to adjust the area of liquid fuel from which evaporation takes place. Various means for adjusting the area of the inner surface of the rotating outer cylinder over which liquid fuel is spread can be used. One example of such a liquid area adjusting means is shown partially in FIG. 7 and comprises a liquid spreader means, 13, fitted with several liquid spreader nozzles, 49, 50, whose springs, 51, 52, act to hold these spreader nozzles closed. Only two of these several spreader nozzles, 49, 50 are shown in FIG. 7, but many can be used in any one spreader means, 13. The springs, 51, 52, each exert a different closing force on their respective spreader nozzles, 49, 50. Thus by increasing the liquid fuel supply pressure in the fuel passage, 53, of the spreader means, 13, more of the spreader nozzles will be opened against their spring closing force, and liquid fuel will be spread over a larger portion of the area of the inner surface of the outer cylinder. For this application, the liquid fuel metering and transferring means, such as element, 12, of FIG. 1, is to supply liquid fuel to the liquid spreader, 13, at a pressure approximately proportional to the engine power output and hence proportional to the product of engine torque and speed. For example, the liquid fuel metering and transferring means, 12, could be a positive displacement pump, driven at a fixed ratio of speed to that of the engine crankshaft, whose displacement was adjustable for engine torque via a control lever, 54. Various alternative means for adjusting the liquid spread area and for metering the liquid fuel quantity to the liquid spreader means can be used.

Where a single rotating outer hollow cylinder is used without a cascade scheme it may be preferred that essentially all of the spread liquid fuel be evaporated within at most, one turn around the outer cylinder centerline so that unevaporated liquid portions will not be remixed with freshly spread liquid. Where a scraper means for removing unevaporated liquid fuel from the inner surface of the outer cylinder is used, continuous use thereof leads to a concentration of low vapor pressure liquid fuel portions in the liquid fuel supply source. For those reasons full evaporation of the spread liquid is preferred in many applications within one turn around the outer cylinder centerline and this can be achieved in several different ways. For example, the speed of rotation of the outer cylinder can be controlled to adjust the time available, in a single turn about the outer cylinder centerline, for fuel evaporation to occur, longer times for full evaporation occurring at slower speeds of rotation and vice versa. The evaporation time of a single turn can be increased this way only down to that rotation speed of the outer cylinder, which just barely holds the spread liquid upon the inner surface by centrifugal force. For example, the drive means, 15, which rotates the outer cylinder, 3, can be controlled by a speed regulator, 55, as shown in FIG. 1. The speed regulator, 55, can in turn be responsive to a fuel vapor sensor, 56, located away from the liquid spreader, 13, in the direction of rotation, 29, by the portion of one turn within which full evaporation is to be completed. Whenever the fuel vapor sensor, 56, senses fuel vapor at this point, indicating full evaporation has not occurred, the sensor signals the speed regulator, 55, to decrease the rotational speed to the outer cylinder, 3, thus increasing the time available for achieving the desired full evaporation.

Alternatively, full liquid fuel evaporation within at most one full turn about the outer cylinder centerline can be achieved by controlling the means for heating the outer cylinder. For example, the heating means, 18, of FIG. 1, can be controlled by a controller, 57, responsive to the fuel vapor sensor, 56, of FIG. 2. When the fuel vapor sensor, 56, finds liquid fuel evaporation incomplete, as described above, the sensor, 56, signals the controller, 57, to increase the rate of heating the outer cylinder, 3, via the heating means, 18, so that liquid fuel evaporation rate is increased. Other sensor means and control means can alternatively be used to achieve the desired full evaporation of the spread liquid fuel within at most one turn about the outer cylinder centerline.

An electrical heating means, 18, for heating the outer rotating cylinder, 3, is shown in FIG. 1, but other heating means can also be used. In many applications it will be preferred to use the engine exhaust gas as the source of heat since this is always available whenever the engine is running and at no extra cost. For example, a controllable portion of the engine exhaust gas can be directed upon the outer surface of the rotating outer cylinder to produce the heating thereof needed for evaporation of the liquid fuel. In this example, the heating rate can be increased by increasing the portion of the exhaust gas, thusly directed upon the outer cylinder and vice versa. Such direct use of the very hot engine exhaust gas for heating the outer cylinder can sometimes produce hot spots in the outer cylinder and consequent carbonization of fuel portions leading to undesirable formation of carbon deposits on the inner surface of the outer cylinder. These carbon deposits problems can be avoided by interposing a heat exchange fluid between the engine exhaust gas and the outer cylinder to be heated. The heat exchange fluid is heated by engine exhaust gas and then passes over the outer surface of the outer cylinder to heat it as needed for evaporation of the spread liquid fuel.

Figure 8:
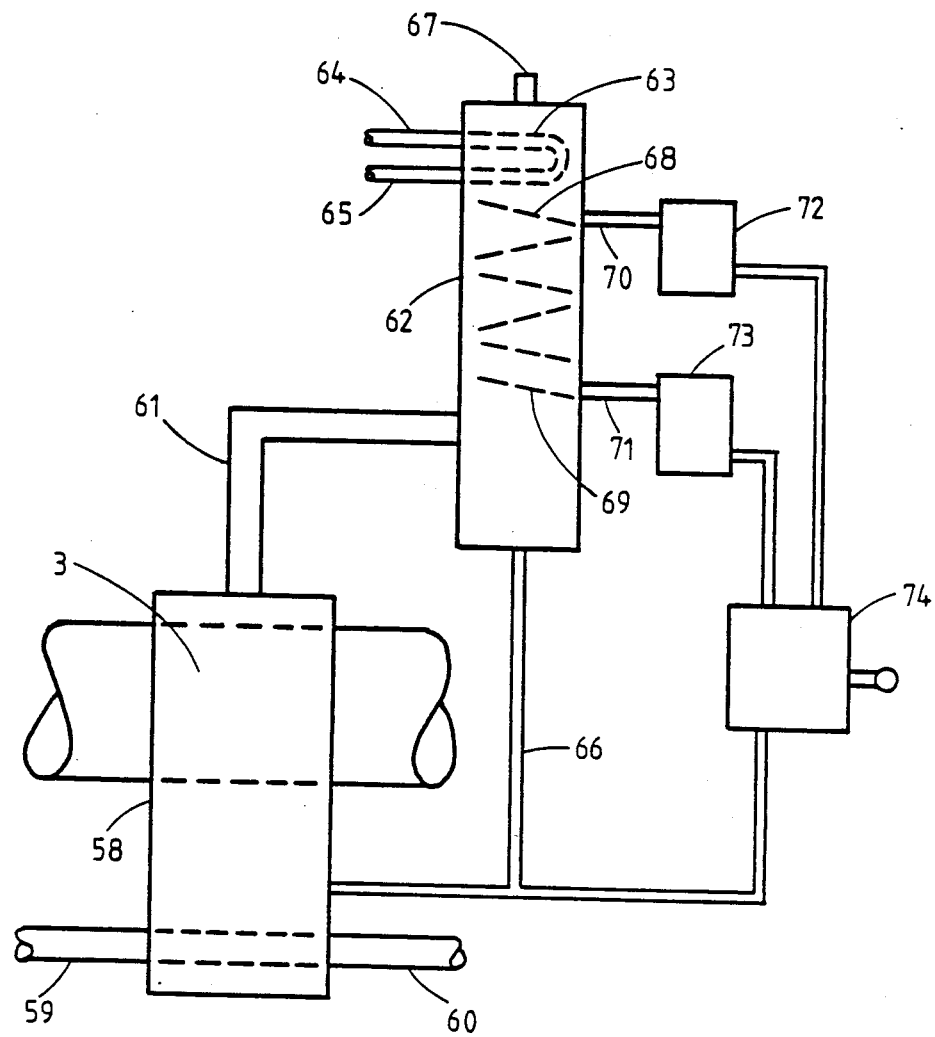

One particular example of a heating means for heating the rotating outer cylinder by use of engine exhaust gas and a heat exchange fluid is shown schematically in FIG. 8 and comprises the following elements:

1. An exhaust gas fired liquid boiler, 58, with a controllable portion of the engine exhaust gas entering the boiler at, 59, and leaving at, 60, after heating and boiling the liquid heat exchange fluid in the bottom of the boiler, 58.

2. The heat exchange fluid vapor from the boiler, 58, passes over the outer surface of the rotating outer cylinder, 3, of the fuel vaporizer and thus supplies thereto the heating needed to evaporate the spread liquid fuel. Some portions of the heat exchange fluid vapor are condensed by this heating of the outer cylinder and the thusly condensed liquid returns directly to the boiler portion, 58. Those heat exchange fluid vapor portions not thusly condensed pass via the vapor pipe, 61, to the fractionator, 62.

3. Within the fractionator, 62, heat exchange fluid vapor rises and is cooled and condensed by the cooling coil, 63, cooled by engine radiator water, or outside air, or other cooling medium, supplied via the pipes, 64, 65. The thusly condensed heat exchange fluid liquid descends through the fractionator, 62, and returns to the boiler, 58, via the liquid return line, 66. The fractionator, 62, can be vented to atmosphere via a vent pipe, 67, to hold constant pressure therein, but this is not always necessary.

4. Where the heat exchange fluid is a single material and the fractionator is vented to atmosphere, a constant vapor temperature will be applied to the outer rotating cylinder for heating at the boiling temperature of the heat exchange fluid and the rate of heating is essentially fixed.

5. A heat exchange fluid comprising two or more materials, differing in boiling point, can be used where an adjustable rate of heating of the outer cylinder is needed. The fractionator, 62, then additionally comprises liquid trays, 68, 69, liquid withdrawal pipes, 70, 71, and liquid holding tanks, 72, 73. The material of higher boiling point will condense sooner in the fractionator, 62, and be withdrawn therefrom lower down via the lower tray, 69, and withdrawal pipe, 71, into the tank, 73. The material of lower boiling point will condense later in the fractionator, 62, and be withdrawn therefrom higher up via the upper tray, 68, and withdrawal pipe, 70, into the tank, 72. In this way the two different materials of the heat exchange fluid are separated as liquids into the two tanks, 72, 73. Liquid is returned from the tanks, 72, 73, to the boiler, 58, via the heating rate controller, 74, the relative proportions of the two materials being adjusted to yield the desired heating rate of the outer cylinder, 3. By returning a high proportion of the higher boiling material from the tank, 73, than of the lower boiling material from the tank, 72, to the boiler, 58, the boiling temperature therein and hence the temperature of the heat exchange fluid vapor passing over and heating the outer cylinder, 3, can be increased and vice versa. The heating rate controller, 74, can be hand adjusted or can be responsive to a fuel vapor sensor such as 56 of FIG. 2.

6. Alternatively the pressure within the boiler, 58, and fractionator, 62, can be adjusted by substituting a pressure regulator for the vent pipe, 67. When boiler pressure is increased vapor temperature and hence heating rate of the outer cylinder are also increased and vice versa. Again this boiler pressure regulator can be hand adjusted or can be made responsive to a fuel vapor sensor such as 56 of FIG. 2. Additionally a boiler pressure sensor can be used to control the portion of engine exhaust gas passing through the boiler, 58, at higher boiler pressures and heating rates and vice versa.

Although each single fuel vaporizer of this invention is preferably connected to an internal combustion engine mechanism with a number of cylinders equal to the number of piston strokes required for a single piston to complete one engine cycle, other numbers of cylinders can also be used. Where this preferred number of cylinders is used, each intake air pulse is separate from the others, but intake air pulses occur essentially continuously in succession. Where more engine cylinders are connected to a single fuel vaporizer than this preferred number, the intake air pulses overlap partially and the variation of air flow rate through the vaporizer is reduced, thus reducing the variation of fuel vapor to air ratio along the principle direction of air flow. The greater the number of cylinders connected to a single fuel vaporizer the smaller becomes this variation of fuel vapor to air ratio along the principle direction of air flow. Where fewer engine cylinders are connected to a single fuel vaporizer than this preferred number, each intake air pulse is separate from the others but intake air pulses do not occur continuously, there being time periods when no intake air pulse is taking place. Evaporation of liquid fuel continues even when no intake air pulse is flowing and thus an unusually rich fuel vapor to air ratio will be created in a portion of the continuously variable stratified fuel vapor air mixture created at intake of such an engine. In most engine uses, we prefer to avoid creation of such unusually fuel rich mixture regions since the subsequent combustion thereof commonly produces undesirable soot and incomplete fuel burnup.

The sizes of the various parts of a fuel vaporizer of this invention are best determined experimentally by engine tests. Preliminary approximate estimates of various sizes can be obtained from the following relations for the preferred case of a single fuel vaporizer being connected to the intake manifold for four cylinders of a four stroke cycle internal combustion engine mechanism.

$$\text{Overall}\left(\frac{FV}{AR}\right) = \left[\frac{q}{A(hfg)}\right][\pi(ro)L]\left[\frac{16}{b^2 sn(da)(ev)(wcr)}\right]$$

$$\frac{\text{Maximum}\left(\frac{FV}{AR}\right)}{\text{Minimum}\left(\frac{FV}{AR}\right)} =$$

$$\left[\frac{(ro)^2 - (ri)^2 + 2(ri)d - d^2}{(ro)^2 - (ri)^2 - 2(ri)d - d^2}\right]\sqrt{\frac{b^2 S(ev)}{16L[(ro)^2 - (ri)^2]}}$$

$$\text{Maximum}\left(\frac{FV}{AR}\right) =$$

-continued $$\left[\frac{q}{A(hfg)}\right]\frac{2(ro)}{[(ro)^2 - (ri)^2 - (2ri)d - d^2]}\left[\frac{8L[(ro)^2 - (ri)^2]}{b^2S(ev)(wcr)}\right] \times$$

$$\left[\frac{1}{\sqrt{\frac{16L[(ro)^2 - (ri)^2]}{b^2S(ev)}}}\right]$$

Wherein the symbols have the following meanings:
FV/AR = Mass ratio of fuel vapor to air;
q/A = Heat transfer rate to outer cylinder, energy units per unit area per unit time;
(hfg) = Latent heat of evaporation of the liquid fuel per unit mass;
n = Number of connected engine cylinders
$\pi$ = 3.1417
(ro) = Radius of the inner surface of the outer cylinder, length units;
(L) = Length of the inner surface of the outer cylinder, length units;
b = Engine cylinder bore, length units;
s = Engine piston stroke, length units;
(da) = Intake air density, mass per unit volume;
(ev) = Fractional volumetric efficiency of the internal combustion engine mechanism;
(wcr) = Angular speed of the crankshaft of the internal combustion engine mechanism, radians per unit time;
(ri) = Radius of the outer surface of the inner solid member assumed cylindrical, length units;
(d) = Distance between centerline of symmetry of outer cylinder and centerline of symmetry of inner member with centerlines assumed parallel, length units;

Any consistent system of units can be used in these relations. These relations additionally assume that liquid fuel is spread over essentially all of the inner surface, $\pi(ro)L$, of the rotating outer cylinder.

Usually the engine sizes, b, s, n, and operating conditions, (da), (ev), (wcr), will be known or can be estimated. The overall ratio (FV/AR) and the intended extent of intake mixture stratification, expressed as the ratio of maximum to minimum fuel vapor to air ratio, are then selected. The heat transfer rate, q/A, depends upon the heating means chosen and can vary over a wide range (circa 4000 to 400,000 B+u/Hr-sq. ft.). The liquid fuel latent heat of evaporation, hfg, can be estimated or measured if necessary. The foregoing approximate relations will then give several suitable fuel vaporizer sizes from which any one combination can be selected. The rotational speed of the outer cylinder is then set at least sufficient to retain the spread liquid on the inner surface thereof:

$$(ro)(wo)^2 = (g)$$

Wherein:
(wo) = Minimum angular speed of the rotating outer cylinder, radians per unit time;
(g) = Gravitational acceleration, length per unit of time squared;

For non preferred cases, where more than four cylinders of a four stroke cycle internal combustion engine mechanism are to be connected to a single fuel vaporizer, the maximum fuel vapor to air ratio is reduced due to intake process overlap but the minimum fuel vapor to air ratio remains essentially the same as for the preferred case. The following approximate relation can be used for preliminary sizing of a fuel vaporizer to be connected to six cylinders of a four stroke cycle engine:

$$\text{Maximum}\left(\frac{FV}{AR}\right) =$$

$$\left[\frac{q}{A(hfg)}\right]\frac{2(ro)}{[(ro)^2 - (ri)^2 - 2(ri)d - d^2]} \times$$

$$\left[\frac{8L[(ro)^2 - (ri)^2]}{b^2S(ev)(wcr)}\right]$$

The following approximate relation can be used for preliminary sizing of a fuel vaporizer to be connected to eight cylinders of a four stroke cycle engine:

$$\text{Maximum}\left(\frac{FV}{AR}\right) =$$

$$\left[\frac{q}{A(hfg)}\right]\frac{2(ro)}{[(ro)^2 - (ri)^2 - 2(ri)d - d^2]} \times$$

$$\left[\frac{8L[(ro)^2 - (ri)^2](1.414)}{b^2S(ev)(wcr)}\right]$$

Having thus described my invention what I claim is:
1. A fuel vaporizer for creating continuously variable fuel vapor air mixtures at engine intake and comprising:
a piston internal combustion engine mechanism comprising: an intake manifold with an inlet thereto; an integral number of engine cylinders, said integral number of cylinders, being at least one;
an outer hollow cylinder comprising: an outer surface; an inner surface; a centerline of symmetry; an inlet end; and outlet end;
an inner solid member comprising: a principle centerline; an outer surface disposed about said principle centerline; said outer surface being everywhere smaller than said inner surface of said outer hollow cylinder when said inner cylinder is placed inside said outer hollow cylinder with said inner cylinder principle centerline approximately parallel to said outer cylinder centerline of symmetry;
means for rotating said outer cylinder about said centerline of symmetry;
means for positioning said inner solid member inside said outer cylinder, so that the said outer surface of said inner solid member is everywhere separated by a finite distance from said inner surface of said outer cylinder; and so that said finite distance of separation between said inner solid member and said outer cylinder varies angularly about said outer cylinder centerline of symmetry;
a liquid fuel supply source;
means for spreading liquid upon the inner surface of said outer cylinder;
means for metering liquid fuel and transferring said metered liquid fuel quantity from said supply source to said liquid spreader means;
means for heating said outer cylinder;
an air inlet;

a fuel air mixture pipe comprising: an inlet end; and outlet end;

means for connecting said air inlet to said inlet end of said outer cylinder so that engine intake air flows inside said outer cylinder;

means for connecting said inlet end of said fuel air mixture pipe to said outlet end of said outer cylinder and said outlet end of said fuel air mixture pipe to said inlet of said engine intake manifold so that fuel mixture created inside said outer cylinder passes through said fuel air mixture pipe and into said engine intake manifold.

2. A fuel vaporizer for creating continuously variable stratified fuel vapor air mixtures at engine intake as described in claim 1:

wherein said means for positioning positions said inner solid member inside said outer cylinder so that said inner solid member principle centerline is essentially parallel to said outer cylinder centerline of symmetry, and is displaced therefrom by a finite centerline distance;

and further comprising:

means for adjusting said finite centerline distance of separation between said inner solid member principle centerline and said outer cylinder centerline.

3. A fuel vaporizer for creating continuously variable stratified fuel vapor air mixtures at engine intake as described in claim 1:

wherein said inner surface of said outer cylinder further comprises means for retaining on said inner surface said liquid spread thereon.

4. A fuel vaporizer for creating continuously variable fuel vapor air mixtures at engine intake as described in claim 1:

wherein said means for heating said outer cylinder further comprises:

means for controlling said means for heating so that liquid fuel spread upon said inner surface of said outer cylinder by said means for spreading liquid is essentially fully evaporated within at most one turn around said centerline of symmetry of said outer cylinder.

5. A fuel vaporizer for creating continuously variable stratified fuel vapor mixtures at engine intake as described in claim 1:

wherein said means for metering liquid fuel and transferring said liquid fuel further comprises:

means for adjusting said metered liquid fuel quantity in proportion to the product of engine speed and torque output.

6. A fuel vaporizer for creating continuously variable stratified fuel vapor air mixtures at engine intake as described in claim 5:

wherein said means for spreading liquid upon the inner surface of said outer cylinder further comprises:

means for adjusting the area of said inner surface of said outer cylinder over which said liquid is spread in proportion to the product of engine speed and torque output.

7. A fuel vaporizer for creating continuously variable stratified fuel vapor air mixtures at engine intake as described in claim 1 and further comprising:

means for removing liquid from said inner surface of said outer cylinder;

means for positioning said means for removing liquid within the inside of said outer cylinder so that liquid fuel spread upon said inner surface of said outer cylinder passes at most one turn around said centerline of symmetry of said outer cylinder; and means for transferring said liquid removed from said inner surface of said outer cylinder to a liquid fuel supply source.

8. A cascade fuel vaporizer for creating continuously variable stratified fuel vapor air mixtures at engine intake and comprising:

at least two fuel vaporizers as described in claim 7, a first fuel vaporizer and a second fuel vaporizer; and means for connecting said at least two fuel vaporizers in cascade so that liquid fuel removed from said inner surface of said outer cylinder of each preceding fuel vaporizer becomes the liquid fuel supply source for the next following fuel vaporizer.

9. A cascade fuel vaporizer for creating continuously variable stratified fuel vapor air mixtures at engine intake and comprising:

at least two fuel vaporizers as described in claim 7, a first fuel vaporizer and a second fuel vaporizer;

means for connecting said at least two fuel vaporizers in cascade so that liquid fuel removed from said inner surface of said outer cylinder of each preceding fuel vaporizer becomes the liquid fuel supply source for the next following fuel vaporizer; and means for connecting said at least two air inlets and said at least two fuel air mixture pipes so that fuel air mixture created inside each preceding fuel vaporizer becomes the intake air for the next following fuel vaporizer and so that engine intake air alone flows inside said outer cylinder of said first fuel vaporizer and so that fuel air mixture flowing through said outer cylinder of said last fuel vaporizer of said cascade passes into said engine intake manifold.

10. A fuel vaporizer for creating continuously variable stratified fuel vapor air mixtures at engine intake as described in claim 1:

wherein said integral number of cylinders of said piston internal combustion engine mechanism is equal to the number of piston strokes required for a single piston to complete one engine cycle.

* * * * *